United States Patent [19]

Spee

[11] Patent Number: 4,849,231
[45] Date of Patent: Jul. 18, 1989

[54] BEVERAGE INGREDIENT HOLDER AND STIRRER

[75] Inventor: Reinier E. Spee, Loenen aan de Vecht, Netherlands

[73] Assignee: Carli Oosterbeek BV, Netherlands

[21] Appl. No.: 133,785

[22] Filed: Dec. 16, 1987

[30] Foreign Application Priority Data

Nov. 16, 1987 [NL] Netherlands ............... 8702732

[51] Int. Cl.⁴ .............................................. A47J 31/40
[52] U.S. Cl. .................................... 426/87; 426/134; 426/132
[58] Field of Search ............... 426/134, 91, 421, 132, 426/87; 206/0.5, 568, 528, 217; 604/57, 59, 77, 78, 92; 30/125; 366/129, 130, 342, 343; 422/266

[56] References Cited

U.S. PATENT DOCUMENTS

| | | | |
|---|---|---|---|
| 1,247,678 | 11/1917 | Hentschel | 426/138 |
| 1,972,799 | 9/1934 | Schnaier | 426/134 |
| 2,128,448 | 8/1938 | Moinewright | 426/85 |
| 2,281,267 | 4/1942 | Chapman | 426/134 |
| 2,429,353 | 10/1947 | Gibson | 426/91 |
| 2,857,908 | 10/1958 | Cornfield | 426/134 |
| 3,126,284 | 3/1964 | Howerin | 426/78 |
| 3,252,803 | 5/1966 | Belasw | 426/134 |
| 3,275,448 | 9/1966 | Sommer | 426/78 |
| 3,312,555 | 4/1967 | Rossi et al. | 426/134 |
| 3,360,121 | 12/1967 | Zoeller et al. | 426/134 |
| 3,386,837 | 6/1968 | Arnot | 426/134 |
| 3,428,460 | 2/1969 | Ely | 426/134 |
| 3,526,316 | 9/1970 | Kalogris | 426/86 |
| 3,663,717 | 5/1972 | Coster | 426/134 |
| 3,824,322 | 7/1974 | Fiorella | 426/134 |
| 3,869,555 | 3/1975 | Heonis | 426/134 |
| 3,968,262 | 7/1976 | Hodska | 426/134 |
| 4,018,902 | 4/1977 | Dee | 426/134 |
| 4,061,783 | 12/1977 | Hoffman et al. | 426/134 |
| 4,096,947 | 6/1978 | Morse | 206/217 |
| 4,215,628 | 8/1980 | Dodd | 99/323 |
| 4,717,016 | 1/1988 | Dalgleish | 206/0.5 |

FOREIGN PATENT DOCUMENTS

| | | | |
|---|---|---|---|
| 655333 | 1/1963 | Canada | 426/134 |
| 1795868 | 9/1959 | Fed. Rep. of Germany . | |
| 2635417 | 2/1978 | Fed. Rep. of Germany | 426/85 |
| 3245711 | 6/1984 | Fed. Rep. of Germany | 426/85 |
| 2158298 | 6/1973 | France | 426/134 |
| 500005 | 11/1954 | Italy | 426/134 |
| 61-143027 | 6/1986 | Japan | 426/134 |
| 279758 | 11/1927 | United Kingdom | 426/134 |

*Primary Examiner*—Steven Weinstein
*Attorney, Agent, or Firm*—John P. Snyder

[57] ABSTRACT

A disposable stirring rod which is easy to manufacture on which a sweetener or other substance for adding to beverages is held as a solid element.

7 Claims, 1 Drawing Sheet

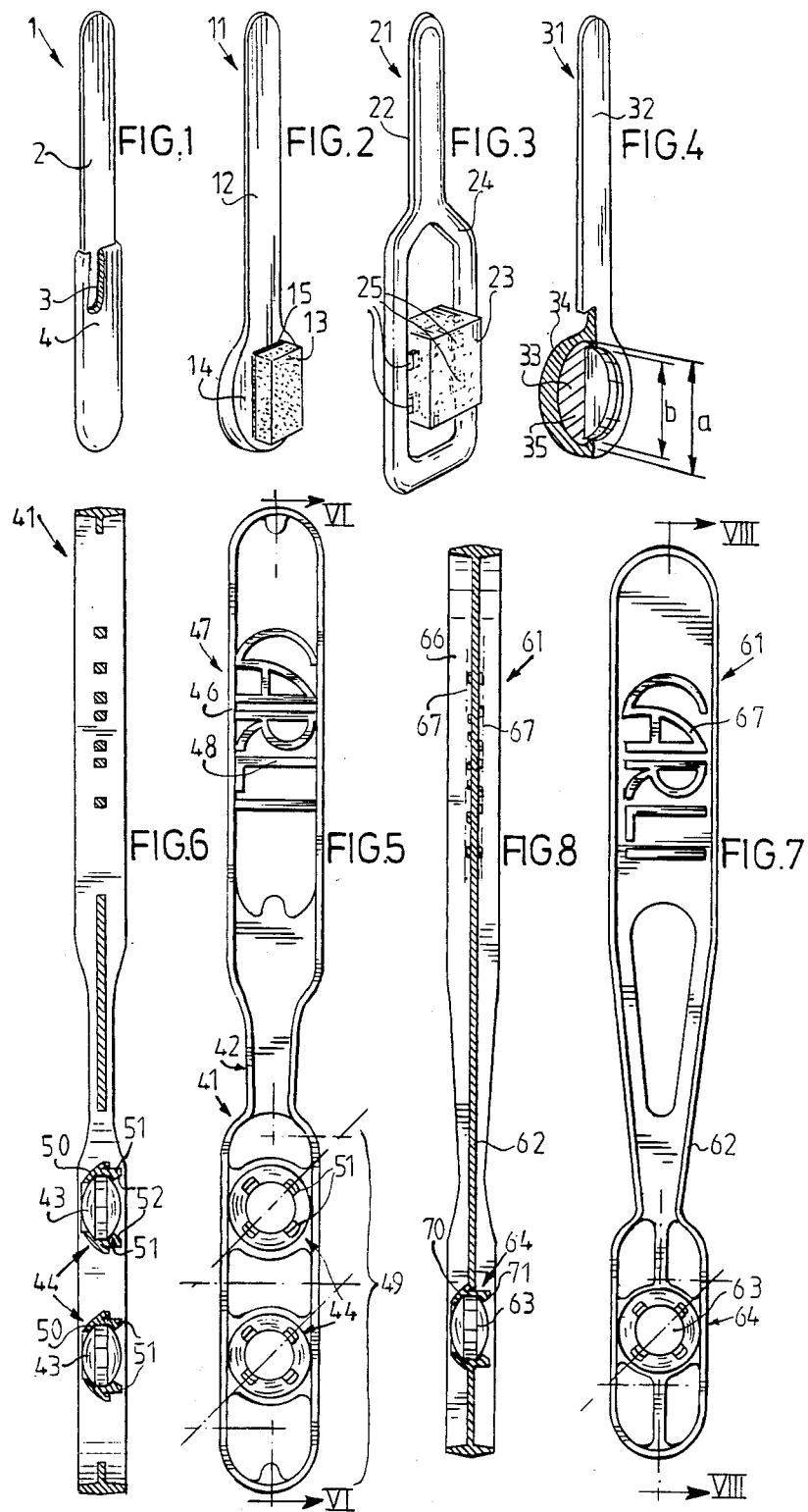

BEVERAGE INGREDIENT HOLDER AND STIRRER

The invention relates to a stirring rod comprising a stirring body, and at least one holder for substance to be added to a beverage arranged on the stirring body. Such a stirring rod is known from the U.S. Pat. No. 4,338,338. This known stirring rod has a holder for accommodating tea or coffee and a separate holder for accommodating sugar therein. Each holder consists of a reservoir in which granular material is located, whereby a wall of the reservoir is provided with perforations to provide liquid with access to the granular material.

During manufacture of this stirring rod, the granular substance has to be placed in the relevant reservoir, after which this reservoir has to be closed, making manufacture difficult, at least in the case of mass production.

The invention has for its object to provide a stirring ring rod which is easy to manufacture and easy to handle.

The stirring rod according to the invention has the feature that the holder holds at least one solid piece of the substance. A solid piece of the substance can easily be attached to a stirring body, particularly when the solid piece is a tablet.

The invention also relates to and provides a stirring body, equipped to hold at least one solid piece of substance to be added to a beverage.

Mentioned and other characteristics of the invention will now be elucidated in the description following hereinafter with reference to a drawing.

BRIEF DESCRIPTION OF THE DRAWINGS

In the drawing in schematic form:

FIGS. 1, 2, 3 and 4 each show a perspective view of as stirring rod according to the invention, whereby FIG. 1 and 4 are partially broken away.

FIGS. 5 and 7 each show a view of in each case a different preferred embodiment of a stirring rod according to the invention;

FIG. 6 shows a section along the line VI—VI from FIG. 5; and

FIG. 8 shows a section along the line VIII—VIII from FIG. 7.

The stirring rod 1 of FIG. 1 comprises a stirring body 2, for example of wood, which has been immersed in warm, liquid sugar or other substance, as a result of which a quantity of substance has remained adhered thereto, this quantity corresponding to a quantity of substance, for example sugar or sweetener, for example aspartam, geared to an amount of beverage, for example a cup of coffee or tea. The substance is then cooled so that a solid piece 3 of the substance is held in the form of a envelope by the lower part of the stirring body 2 acting as holder 4. The quantity of substance to be added to the beverage can easily be regulated by inserting the stirring rod more or less deeply into the beverage which is to be stirred.

The stirring rod 11 in FIG. 2 comprises a stirring body 12, for example of plastic, to which a sugar lump 13 is adhered, for example with a layer 15 of liquid sugar.

Stirring rod 21 from FIG. 3 comprises a stirring body 22 the lower part of which forms a holder 24, in which a sugar lump 23 can be held by means of elastic outwardly bendable fingers 25.

Stirring rod 31 from FIG. 4 comprises a stirring body 32 formed as an injection moulded piece, of which the lower part acting as holder 34 has a hollow 35 with an inner dimension a bigger than the dimension b of the entrance. In a mould (not drawn) this holder 34 is filled with substance in powder form, for example sweetener, and this substance is pressed in this mould to a tablet 33 adapting to the shape of holder 34.

Stirring rod 41 from FIGS. 5 and 6 comprises a stirring body 42 manufactured as an injection moulded piece of plastic, for example PVC, the upper part of which is a handle 46 of such a width that it can also serve as an information carrier. Preferably the information 47 is moulded onto handle 46 in the form of letters forming grid elements 48.

The lower part 49 takes a grid-like form and comprises two holders 44, each constructed of a disc-shaped ring 50 with a plurality of, for example four, elastic fingers 51 distributed over the periphery.

A manufactured sweetener table 43 which is obtainable everywhere on the market can easily be pressed from outside between the elastic fingers 51 onto the ring 50, whereby the fingers 51 are then bent outward. The fingers 51 preferably have hooks 52 at their fee ends in order to hold a tablet 43 firmly. It is also conceivable that a tablet 43 be held between elastic fingers only by frictional resistance. A tablet 43 can easily be placed into such a holder 44 manually. Preferably, this takes place automatically and more preferably in series following on from the injection moulding process for manufacture of stirring body 42. Stirring body 42 can be taken out of the mould by means of a gripper member and a tablet 43 can be picked up by means of a sucker element and pressed into a holder 44. It is particularly conceivable that a series of stirring bodies together fastened to a carrying strip leave a mould in a particular orientation and are supplied in this position to a tablet press or a tablet handling machine, which presses a tablet 43 into each of the holders 44. The stirring rods 41 filled with tablets 43 are separated later from the carrying strip.

The information 47 might with advantage be a trademark, preferably the trademark of the sweetener tablet 43 carried by the holder and/or the trademark of the firm making the stirring rod available, for example an airline company, a theatre, a catering establishment, a production company or a service company, where drinks like coffee or tea are offered to visitors or personnel in canteens or conference rooms. The stirring rods 41 can be presented with the handles 46 pointing upward in a presentation holder, so that a stirring rod can easily be removed from it without the sweetener tablets 43 present being touched. The hygienic presentation of sugar lumps available on the market has been solved by wrapping the lumps. Unwrapping lumps while holding a filled coffee cup is a tricky business which often ends in spillage.

It is remarked that only the bottom tablet 43 is dissolved in the liquid in the case where a single dosage is sufficient.

The above mentioned stirring rods according to the invention can be manufactured at a low cost price and can be considered as disposable rods. Particularly suitable as the substance to be added to the beverage is a sweetening tablet, for example aspartam, saccharin and/or cyclamate, in addition to powdered milk in tablet form. Also conceivable is a tablet of sweetener substance with colouring and flavouring so that by means of a stirring rod according to the invention lemonade can then be made from water.

Stirring rod 61 from FIGS. 7 and 8 corresponds with stirring rod 41, with the understanding that the former has only one holder 64, and that the information 67 on the handle 66 does not form grid elements but is moulded on above a supporting surface. Different information 67 can be arranged on either side, on one side for example concerning the composition and/or origin of the substance, and on the other side concerning the trademark and/or activities of the company offering the stirring substance.

I claim:

1. A stirring rod which comprises the combination of an elongate body of molded plastic material presenting a handle portion at one end adapted to be grasped by a user to insert an opposite end of the body into liquid to be treated, the opposite end of the body being of grid-like form defining at least one holder, the holder comprising a disc-shaped ring having a plurality of elastic fingers distributed over the periphery of the ring and extending upwardly and radially inwardly thereof in overlying relation to the ring, and a water soluble beverage ingredient tablet seated in the ring and held thereagainst by the elastic fingers.

2. A stirring rod as defined in claim 1 including a second holder disposed in spaced relation to the first mentioned holder.

3. A stirring rod as defined in claim 1 wherein the opposite end of the body comprises opposite side edge members between which the holder extends and is peripherally joined thereto.

4. A stirring rod as defined in claim 3 wherein the handle portion comprises opposite side edge members which extend to the respective side edge members of the opposite end of the body and including a necked-down portion separating the opposite end of the body from the handle portion.

5. A stirring rod as defined in claim 4 including indicia between the side edge members of the handle portion.

6. A stirring rod as defined in claim 5 wherein the indicia bridge between and join the side edge members of the handle portion.

7. A stirring rod as defined in claim 5 including a web extending between and joining the side edge members of the handle portion, the indicia being disposed on opposite sides of the web.

* * * * *